United States Patent
Harris

(10) Patent No.: US 9,028,205 B2
(45) Date of Patent: May 12, 2015

(54) VARIABLE BLADE OUTER AIR SEAL

(75) Inventor: Meggan Harris, Colchester, CT (US)

(73) Assignee: United Technologies Corporation, Hartford, CT (US)

(*) Notice: Subject to any disclaimer, the term of this patent is extended or adjusted under 35 U.S.C. 154(b) by 478 days.

(21) Appl. No.: 13/495,454

(22) Filed: Jun. 13, 2012

(65) Prior Publication Data

US 2013/0336758 A1 Dec. 19, 2013

(51) Int. Cl.
*F01D 11/22* (2006.01)
*F02C 9/16* (2006.01)

(52) U.S. Cl.
CPC .. *F01D 11/22* (2013.01); *F02C 9/16* (2013.01)

(58) Field of Classification Search
CPC .......... F01D 11/22; F01D 11/14; F01D 11/18
USPC .............. 415/126, 127, 128, 196, 197, 173.1, 415/173.2, 174.1, 174.4
See application file for complete search history.

(56) References Cited

U.S. PATENT DOCUMENTS

| 3,085,398 | A |  | 4/1963 | Ingleson |
| 4,332,523 | A |  | 6/1982 | Smith |
| 5,018,942 | A |  | 5/1991 | Ciokajlo |
| 5,049,033 | A |  | 9/1991 | Corsmeier et al. |
| 5,054,997 | A |  | 10/1991 | Corsmeier et al. |
| 5,056,988 | A |  | 10/1991 | Corsmeier et al. |
| 5,096,375 | A |  | 3/1992 | Ciokailo |
| 5,104,287 | A |  | 4/1992 | Ciokajlo |
| 5,157,914 | A | * | 10/1992 | Schwarz et al. ................ 60/795 |
| 5,228,828 | A |  | 7/1993 | Damlis et al. |
| 5,545,007 | A | * | 8/1996 | Martin ....................... 415/173.2 |
| 6,672,831 | B2 |  | 1/2004 | Brandl et al. |
| 7,195,452 | B2 |  | 3/2007 | Allan et al. |
| 7,575,409 | B2 |  | 8/2009 | Dierksmeier et al. |
| 2004/0100034 | A1 |  | 5/2004 | Coppola |
| 2007/0020095 | A1 |  | 1/2007 | Dierksmeier et al. |
| 2008/0267769 | A1 |  | 10/2008 | Schwarz et al. |
| 2010/0095650 | A1 |  | 4/2010 | Schafer |

OTHER PUBLICATIONS

International Search Report and Written Opinion, dated Mar. 20, 2014, for PCT Application No. PCT/US2013/042447, 13 pages.

* cited by examiner

*Primary Examiner* — Edward Look
*Assistant Examiner* — Christopher J Hargitt
(74) *Attorney, Agent, or Firm* — Kinney & Lange, P.A.

(57) ABSTRACT

A system for a turbofan has a variable outer air seal, an actuator coupled to the variable outer air seal, a sensor positioned inside the turbofan for sensing an engine parameter, and a flight controller connected to the turbofan for receiving the parameter from the sensor. The flight controller directs the actuator to regulate the position of the actuator based on the flight condition resulting form the received parameter.

13 Claims, 3 Drawing Sheets

VARIABLE BLADE OUTER AIR SEAL

BACKGROUND

This invention relates to blade outer air seals (BOAS) for gas turbine engines and, particularly to a variable BOAS arrangement that effectuates active clearance control.

In the gas turbine engine field of technology, a great effort has been devoted to improve engine operating performance by attempting to hold the clearance of the gap between the outer air seal and the tip of the turbine blade at a minimum during the full range of the engine's operating envelope. What has developed over the years is a host of structures and concepts that have through active and passive clearance controls attempted to achieve this end. To some degree, many of these structures and concepts have proven to be successful, but owing to the increasing demands on engine and aircraft performance, the problem has become increasingly more difficult. The solution to the problem is also predicated on the type of aircraft/engine being designed and to its particular mission. What may be satisfactory for say, aircraft used by commercial airlines is often not satisfactory for military aircraft, particularly those designed to be in the fighter class.

For example, in engines designed for use in aircraft used for commercial applications, such as those used in revenue service, the active clearance controls have been proven to be fairly successful. In one form, this type of control judiciously impinges air on the engine's outer case in proximity to the turbine rotor in order to shrink the case at predetermined times during its operating envelope and hence, position the outer air seal closer to the tips of the turbine or compressor blades so as to reduce the gap.

In contrast to the active clearance control design philosophy, the passive clearance control utilizes a continuous means to effectuate the control of these clearances. For example, one such system continuously impinges cooling air on the outer engine case in proximity to the rotor blades to limit the rate of expansion of the outer case subjected to elevated temperatures in order to hold clearances to a minimum. In short the "active" type of control requires a control system that responds to an input and applies hot or cold air or mechanical means in order to effectuate control of the clearances. The "passive" type of clearance control doesn't require a control system and is in a quiescent state at all times.

Historically, it has been observed that high pressure turbine blades wear in to the respective BOAS in a variable manner. The clearance control systems currently utilized, either passive or active, are not capable of moving the BOAS away from the blades and maintaining clearance at a high rate or across the entire engine envelope. This significantly affects performance of engines, especially newer commercial engines.

SUMMARY

In one embodiment, a system for a turbofan has a variable blade outer air seal, an actuator coupled to the variable blade outer air seal, a sensor positioned inside the turbofan for sensing an engine parameter, and a flight controller connected to the turbofan for receiving the parameter from the sensor. The flight controller directs the actuator to regulate the position of the actuator based on the flight condition resulting from the received parameter.

DETAILED DESCRIPTION

Figure 1:
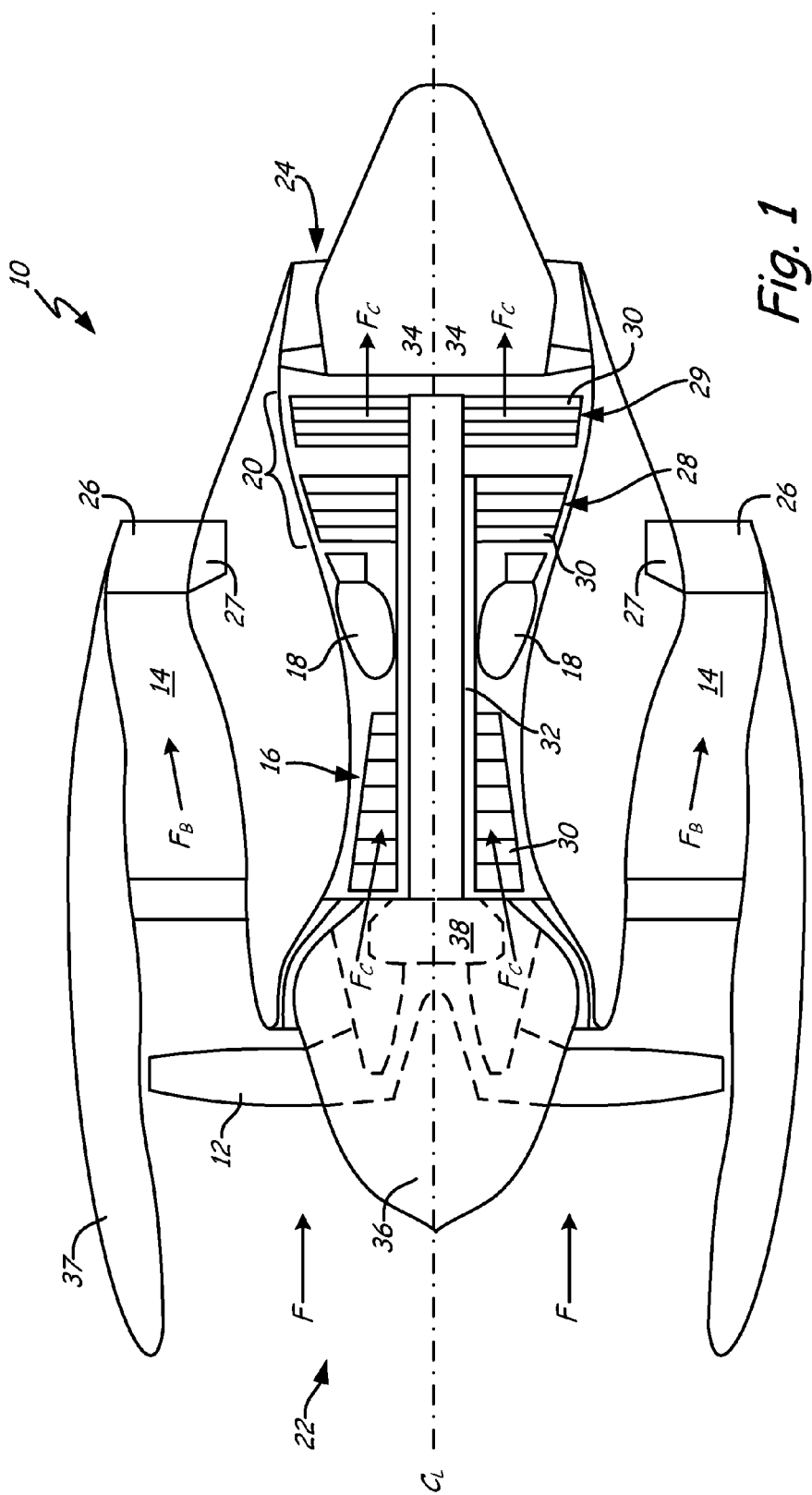
FIG. 1 is a cross-sectional view of a turbine engine.

FIG. 1 is a cross-sectional view of turbine engine 10, in a turbofan embodiment. Turbofan engine 10 comprises fan 12 with bypass duct 14 oriented about a turbine core comprising compressor 16, combustor 18 and turbine 20, which are arranged in flow series with upstream inlet 22 and downstream exhaust 24.

Variable area nozzle 26 is positioned in bypass duct 14 in order to regulate bypass flow FB with respect to core flow FC, in response to adjustment by actuator(s) 27. This allows turbofan 10 to control or limit the temperature of core flow FC, including during times of peak thrust demand as described below.

Turbine 20 comprises high-pressure (HPT) section 28 and low-pressure (LPT) section 29. Compressor 16 and turbine sections 28 and 29 each comprise a number of alternating blade and vane airfoils 30. HPT section 28 of turbine 20 is coupled to compressor 16 via HPT shaft 32, forming the high pressure spool. LPT section 29 is coupled to fan 12 via LPT shaft 34, forming the low pressure or fan spool. LPT shaft 34 is coaxially mounted within HPT shaft 32, about turbine axis (centerline) CL, such that the HPT and LPT spools rotate independently.

Fan 12 is typically mounted to a fan disk or other rotating member, which is driven by LPT shaft 34. As shown in FIG. 1, for example, fan 12 is forward-mounted in engine cowling 37, upstream of bypass duct 14 and compressor 16, with spinner 36 covering the fan disk to improve aerodynamic performance. Alternatively, fan 12 is aft-mounted in a downstream location, and the coupling configuration varies. Further, while FIG. 1 illustrates a particular two-spool high-bypass turbofan embodiment of turbine engine 10, this example is merely illustrative. In other embodiments turbine engine 10 is configured either as a low-bypass turbofan or a high-bypass turbofan, as described above, and the number of spools and fan position vary.

In the particular embodiment of FIG. 1, fan 12 is coupled to LPT shaft 34 via a planetary gear or other geared fan drive mechanism 38 (shown in dashed lines), which provides independent speed control. More specifically, fan gear 38 allows turbofan 10 to control the rotational speed of fan 12 independently of the high and low spool speeds (that is, independently of HPT shaft 32 and LPT shaft 34), increasing the operational control range for improved engine response and efficiency.

In operation of turbofan 10, airflow F enters via inlet 22 and divides into bypass flow FB and core flow FC downstream of fan 12. Bypass flow FB passes through bypass duct 14, generating thrust, and core flow FC passes along the gas path through compressor 16, combustor(s) 18 and turbine 20.

Compressor 16 compresses incoming air for combustor(s) 18, where it is mixed with fuel and ignited to produce hot combustion gas. The combustion gas exits combustor(s) 18 to enter HPT section 28 of turbine 20, driving HPT shaft 32 and compressor 16. Partially expanded combustion gas transitions from HPT section 28 to LPT section 29, driving fan 12 via LPT shaft 34 and, in some embodiments, fan gear 38. Exhaust gas exits turbofan 10 via exhaust 24.

Fan gear mechanism 38 allows turbine engine 10 to further regulate one or both of bypass flow FB and core flow FC by independently adjusting the speed of fan 12. In one such embodiment, for example, turbofan 10 utilizes fan gear 38 to increase efficiency and reduce engine noise (including noise from fan 12) by synchronizing airspeed and turbofan exhaust velocity during takeoff, climb, or landing.

The thermodynamic efficiency of turbofan 10 is strongly tied to the overall pressure ratio, as defined between the compressed air pressure entering combustor(s) 18 and the delivery pressure at intake 22. In general, higher pressure ratios offer increased efficiency and improved performance, including greater specific thrust, but also result in higher peak gas path temperatures, particularly downstream of combustors(s) 18, including HPT section 28 (e.g., the T4 stage). Higher temperatures may increase wear on turbofan components such as airfoils 30, reducing service life.

Figure 2:
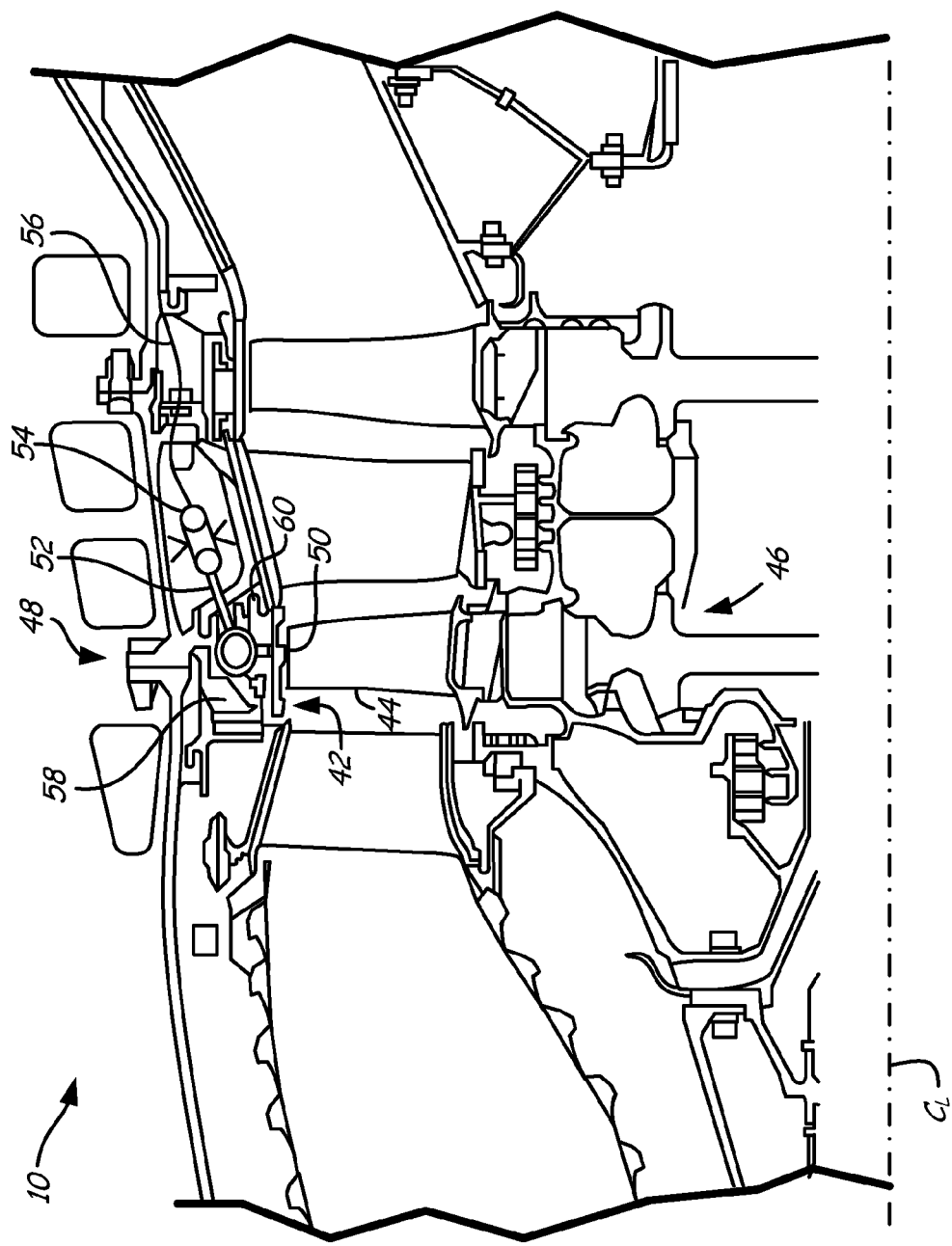
FIG. 2 is a cross-sectional view of the high pressure turbine of the turbine engine.

Referring to FIG. 2, the turbine section of a gas turbine engine 10 includes a blade outer air seal 42 (hereinafter "BOAS") disposed between a plurality of circumferentially disposed rotor blades 44 of a rotor stage 46 and an annular outer engine case 48 (hereinafter "engine case"). In one embodiment, the BOAS 42 includes a plurality of circumferentially extending segments and is adapted to limit air leakage between blade tips 50 and the engine case 48 that are evenly spaced about an engine centerline C/L. BOAS 42 is supported by rails 58 and 60 attached to engine case 48. BOAS 42 is also connected to actuator 54 through rod 52, and actuator 54 is wired to a control system via cable 56.

Figure 3:
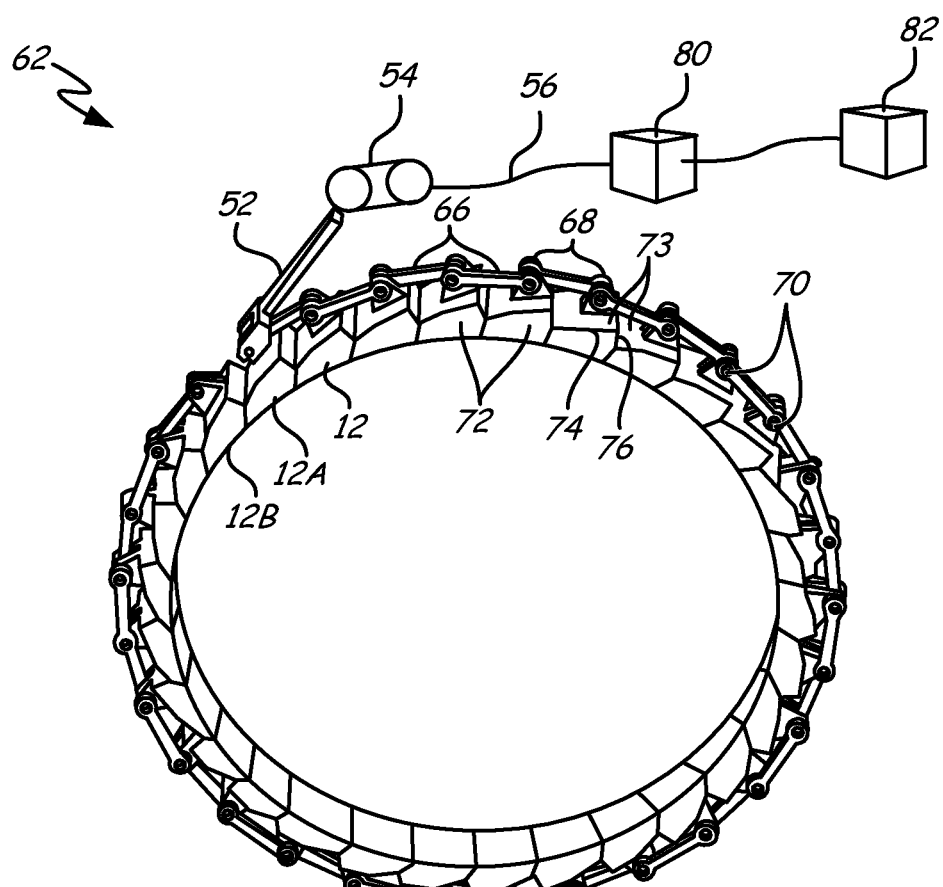
FIG. 3 is a perspective diagram of a modulated blade outer air seal system.

FIG. 3 is a perspective diagram of a modulated BOAS system 62, which includes BOAS 12 having and inclined surface 74 attached to a base portion 76. Each BOAS has an inner diameter (ID) face 72 and an outer diameter (OD) surface 73. OD surface contains an extension 68, such as a stanchion, tab, or like structure that has an aperture for receiving pin 70. Each adjacent BOAS 12 is connected to those adjacent through link 66 attached with pin 70, except for segments 12A and 12B, which are only attached to a single adjacent BOAS 12. Segment 12 B is not connected to another structure, while segment 12A is attached to actuating rod 64. Actuating rod 64 is attached to actuator 54. Actuator 54 is attached to a control system through cable 56, which is an insulated wire harness in one embodiment.

As shown in FIG. 3, the control system has sensor 80, for example a thermocouple, which may be positioned to sense gas path temperature at a particular location along core flow FC. In a particular embodiment, for example, sensor 80 extends through the turbine case to measure temperature proximate the T4 (fourth) stage of HPT section 28, where airfoils 30 and the other components of turbofan 10 are susceptible to thermal damage due to peaking gas path temperatures. Alternatively, temperature sensor 80 is positioned proximate another stage of HPT section 28, or within LPT section 29 or compressor 16. In further embodiments, a number of temperature probes are positioned in different locations within turbofan 10, in order to measure multiple gas path temperatures TC along core flow FC.

Flight controller 82 comprises flight condition module, thrust control, and other related engine functions. Depending on embodiment, flight controller 82 typically comprises a number of additional flight, engine and navigational systems utilizing other control, sensor, and processor components located throughout turbofan engine 10, and in other regions of the aircraft.

Flight controller 82 includes a combination of software and hardware components configured to determine and report flight conditions relevant to the operation of turbofan 10. In general, flight controller 82 includes a number of individual flight modules, which determine a range of different flight conditions based on a combination of pressure, temperature and spool speed measurements and additional data such as attitude and control surface positions. With particular respect to sensor 80, the flight module of controller 82 determines flight conditions including, but not limited to, altitude, airspeed, ground speed, ambient air pressure, outside air temperature, high and low spool speeds N1 and N2, and additional spool speeds, such as the rotational speed of fan 12.

Flight controller 82 comprises a control law (CLW) configured to direct actuator 54 to adjust the modulated BOAS 62. The CLW directs actuator 54 based on the sensed inputs from sensor 80, the flight conditions determined by flight module, and other parameters, such as core flow gas path temperatures TC. In particular, flight controller 82 directs actuator 54 to adjust rod 52 in order to regulate the gap between the blade tips and ID face 72 of BOAS 12. The linkage design connected to modulated BOAS 62 is designed such that if pushed in one direction, linkages are pulled in tension, thus increasing the diameter of the modulated BOAS 62, while movement in the other direction creates compression within the linkages and decreases the overall diameter of modulated BOAS 62. The movement may be likened to that of a camera aperture.

Flight controller 82 is utilized to control parameters during peak thrust cycles, including lifetime-limiting takeoff and climb cycles in which a substantial fraction, if not most, of overall engine wear occurs. Modulated BOAS 62 is also configurable to respond to additional parameters such as the fan and spool speeds, in order to increase the maximum thrust rating while continuing to maintain lower gas path temperatures, thus improving engine performance without increasing wear on lifetime-limited parts.

In additional embodiments, sensor 80 detects temperature, deflections, pressure, or is an accelerometer, or is optic sensor measuring the gap between the blade tips and ID face 72 of BOAS 12. The design allows for one dithering actuator that is in constant motion to provide true active clearance control. Actuator 54 is attached to overlapping BOAS segments linked together to provide directly driven motion. The BOAS segments are supported on tracks 58, 60 attached to engine case 48 that allow for movement in either direction, depending on the actuation provided. Actuator 54 actively modulates the system, being driven off various sensor measurements during engine operation. Thus, the system created has all of the BOAS segments moving variably in response to system parameters to maintain optimal performance. The system has the ability to control HPT blade tip gaps across the entire flight envelope to optimize performance during all portions of a flight. The proposed design also reduces cost and weight over prior art systems as tight tolerances and specific component control is no longer required. The aforementioned system assumes there is variation that is not controlled, and provided critical interface movement to maintain performance. This allows for a simplified design in surrounding components, such as mid-turbine frames, support bearings, and the like. Alternately, the disclosed design could be adapted for other engine components, such as an outer air seal for a compressor stage of the turbine engine.

DISCUSSION OF POSSIBLE EMBODIMENTS

The following are non-exclusive descriptions of possible embodiments of the present invention.

A system for a turbofan has a variable outer air seal, an actuator coupled to the variable outer air seal, a sensor positioned inside the turbofan for sensing an engine parameter, and a flight controller connected to the turbofan for receiving the parameter from the sensor. The flight controller directs the actuator to regulate the position of the actuator based on the flight condition resulting form the received parameter.

The system of the preceding paragraph can optionally include, additionally and/or alternatively any one or more of the following features, configurations, and/or additional components:

the sensor is a thermocouple;

the actuator is coupled to the variable outer air seal through a single pin connection;

the sensor is positioned in a high pressure turbine section of the turbofan, and wherein the actuator closes the variable outer air seal such that the gas path flow area reduced in the high pressure turbine section;

the variable outer air seal comprises a plurality of segments, wherein each segment contains at least one inclined surface;

each of the plurality of segments further comprise an extension from an outer surface of the segment, the extension containing an aperture;

the variable outer air seal further comprises a series of links to connect adjacent segments, each link joined to an extension of at least one of the plurality of segments; and/or the flight controller continuously controls movement of the actuator while the turbofan is running.

A control method comprises sensing a parameter for the turbofan, varying the position of a variable outer air seal of at least one stage in response to the sensed parameter, and controlling the turbofan by regulating the parameter.

The control method of the preceding paragraph can optionally include, additionally and/or alternatively any one or more of the following features, configurations, steps, and/or additional components:

varying the position of the of the variable outer air seal with a single actuator connected to a series of linkages to connect adjacent segments of the stage, each linkange joined to an extension of at least one of the plurality of segments;

the sensed parameter is selected from temperature, deflection, or pressure;

the sensing is done by a sensor that is an accelerometer, or an optic sensor that measures the gap between a blade tip and an inner diameter face of the variable outer air seal;

the sensing is done by a sensor positioned in a high pressure turbine section of the turbofan, and wherein the varying is done by an actuator closes the variable outer air seal such that the gas path flow area reduced in the high pressure turbine section; and/or controlling is performed by a flight controller that continuously controls movement of the actuator while the turbofan is running.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for a turbofan, the system comprising:
   a variable outer air seal including a plurality of individual segments, the plurality of individual segments joined by a series of links to connect adjacent segments;
   an actuator coupled to the variable outer air seal by a connecting rod that extends from the actuator to at least one link of the series of links;
   a sensor sensing an engine parameter; and
   a flight controller connected to the turbofan for receiving the parameter from the sensor; wherein the flight controller directs the actuator to regulate the position of the actuator based on the flight condition resulting from the received parameter.

2. The system of claim 1, wherein the sensor is a thermocouple.

3. The control system of claim 1, wherein the rod is coupled to the variable outer air seal through a pin connection.

4. The control system of claim 3, wherein the sensor is positioned in a high pressure turbine section of the turbofan, and wherein the actuator closes the variable outer air seal such that the gas path flow area reduced in the high pressure turbine section.

5. The control system of claim 1, wherein each segment contains at least one inclined surface.

6. The control system of claim 5, wherein each of the plurality of segments further comprise:
   an extension from an outer surface of the segment, the extension containing an aperture.

7. The control system of claim 6, wherein each link is joined to an extension of at least one of the plurality of segments.

8. The control system of claim 1, wherein the flight controller continuously controls movement of the actuator while the turbofan is running.

9. A control method for a turbofan, the method comprising:
   sensing a parameter for the turbofan;
   varying the position of a variable outer air seal of at least one stage in response to the sensed parameter, wherein the varying the position of the variable outer air seal is done with a rod extending from a single linear movement actuator, the rod being connected to a series of linkages to connect adjacent segments of the stage, each linkage being joined to an extension of at least one of the plurality of segments; and
   controlling the turbofan by regulating the parameter.

10. The control method of claim 9, wherein the sensed parameter is selected from temperature, deflection, or pressure.

11. The control method of claim 9, wherein the sensing is done by a sensor that is an accelerometer or an optic sensor that measures the gap between a blade tip and an inner diameter face of the variable outer air seal.

12. The control method of claim 9 wherein the sensing is done by a sensor positioned in a high pressure turbine section of the turbofan, and wherein the varying is done by an actuator closes the variable outer air seal such that the gas path flow area reduced in the high pressure turbine section.

13. The control method of claim 12 wherein controlling is performed by a flight controller that continuously controls movement of the single linear movement actuator while the turbofan is running.

* * * * *